United States Patent Office 3,360,430
Patented Dec. 26, 1967

3,360,430
METHOD OF CONTROLLING SOIL FUNGI WITH BIS(CHLOROMETHYL)DISULFIDE
Silvio L. Giolito, Whitestone, N.Y., and Thomas B. Williamson, Santa Clara, Calif., assignors to Stauffer Chemical Company, New York, N.Y., a corporation of Delaware
No Drawing. Filed Jan. 16, 1962, Ser. No. 166,700
The portion of the term of the patent subsequent to Apr. 19, 1982, has been disclaimed
1 Claim. (Cl. 167—22)

This invention pertains to a method for controlling the growth of microorganisms particularly soil fungi and to biocidal compositions for use in connection with said method.

The present invention is predicated on the finding that bis (chloromethyl) disulfide exhibits unusually potent microbiocidal activity. It has furthermore been ascertained that this valuable and unexpected property can be effectively utilized in controlling the growth of several types of microorganisms such as soil fungi and bacteria to mention a few. However, it is as a soil fungicide that bis (chloromethyl) disulfide is especially outstanding. For instance, this compound when employed in a concentration of 2.5 p.p.m. gave 100% control of *Fusarium solani*, a typical representative of the type of soil fungi which infect commercial crops. In this evaluation, the test crop consisted of pinto bean plants. It has also been ascertained that bis (chloromethyl) disulfide is non-phytotoxic and such unexpected ancillary property greatly contributes and re-enforces the manifestly valuable biological properties of this toxicant. In this connection, it is to be pointed out that the 100% control of *Fusarium solani* obtained in the above described test was achieved with no evidence of phytotoxicity. In fact, even in such massive doses as 55 p.p.m. the pinto beans exhibited only moderate symptoms of phytotoxicity. It can thus be seen that the high degree of microbiocidal activity coupled with negligible phytotoxicity represent a combination of eminently useful properties when provided by one chemical structure.

In preparing biocidal compositions based on the compound of this invention, the usual methods of formulation known to the art can be resorted to. For example, the compositions can be prepared in the form of solids or liquids. Solid compositions are formulated to give homogeneous free-flowing dust by admixing the active component of the invention with finely divided solids as exemplified by talc, natural clays, diatomaceous earth, fuller's earth or various flours such as walnut shell, wheat, soya bean, cotton seed flours and the like. In the event liquid compositions are desired, these may be produced by admixing the toxicant of the invention with a suitable liquid diluent. In some cases the compounds are sufficiently soluble in the common pesticide solvents such as kerosene, xylene, fuel oil, the alkylated naphthalenes and the so obtained solutions can be applied directly. Such solutions may also contain a surface-active agent in order that the active compounds can be readily dispersed in water or other liquids. Such aqueous dispersions are readily applied as a spray or mist. The surface-active agents can be of the anionic, cationic or nonionic types. Typical examples of such surface-active agents are sodium stearate, potassium laurate, morpholine oleate, sodium lauryl sulfate, sodium 2-ethylhexyl sulfate, sodium naphthalenesulfonate, sodium alkylnaphthalenesulfonate, sodium sulfosuccinate, sodium oleic acid sulfonate, sodium caster oil sulfonate, glycerol monostearate containing a soap (or a sodium fatty alcohol sulfate), lithium stearate, magnesium oleate, aluminum stearate, methyl cellulose, sodium salt of ligninsulfonic acid, polyoxyethylene fatty alcohol ethers, polyglycol fatty acid esters, polyoxyethylene modified fatty acid esters, polyoxyethylene-polyol fatty acid esters, polyoxypropylene fatty alcohol ethers, polypropylene glycol fatty acid esters, polyoxypropylene modified fatty acid esters, polyoxypropylenepolyol fatty acid esters, polyol fatty acid monoesters, lecithin, di- and higher polyhydric alcohol fatty acid esters, cholesterol and other fatty acid esters, lanolin, oxidized fatty oils, quaternary ammonium salts such as lauryl dimethyl benzyl ammonium chloride, amine hydrochlorides such as laurylamine hydrochloride, alkylated aryl polyether alcohols such as the condensation product of diamylphenol with ethylene oxide, and the like. Mixtures of such agents can be used to combine or modify properties. The proportion of these agents will ordinarily vary from about 1% or less to about 15% by weight of the pesticidal compositions. Other pesticides as well as such adjuncts as fertilizers, activators, adhesives, spreaders and synergists can be added to the formulations if desired.

The following specific tests were carried out with the bis (chloromethyl) disulfide of this invention—in vitro:

*Sealed vial*

1 oz. bottles were partially filled with 10 ml. of malt or nutrient broth and capped with aluminum foil and sterilized. The toxicant, as described herein, was injected by means of a syringe through the foil and into the broth. Next water suspension of *Aspergillus niger*, *Penicillium* and *Rhizopus nigricans* were injected into the bottles and the bottles sealed and held one week before the results were read. The results showed that the aforenamed microorganisms were completely controlled at 5 p.p.m. a concentration which represented the lowest used in this evaluation.

*Agar plate*

The purpose of this test is to ascertain whether a compound exhibits fungicidal activity in the vapor phase. Approximately 0.1 gram of the compound was placed in a 0.5 ml. micro beaker which was inserted in a petri dish containing hardened potato dextrose agar. Spores of microorganisms were dusted on to the agar surface and fungus growth noted and recorded after a period of one week. The following results were obtained:

|  | Complete control at (p.p.m.) |
|---|---|
| *Staphylococcus aureus* | 10 |
| *Erwinia amylovora* | 25 |
| *Escherichia coli* | 25 |

As previously pointed out, bis (chloromethyl) disulfide exhibited a high degree of effectiveness in controlling such well known soil fungi as *Fusarium solani*. These results were obtained by means of a soil fungicide test which comprises mixing the soil fungi with 1 lb. of sterilized soil contained in 1 qt. jars. A small depression was formed in the soil and the hole filled with coarse sand. 1 ml. of 5% solution of the toxicant was added to the sand and the jar sealed and the contents shaken thoroughly in order to mix the compound and sand throughout the soil. The so-treated soil was then transferred to a paper container seeded with pinto beans and sealed with water. In the case of pinto beans infected with *Fusarium solani*, the results were observed 3 to 4 weeks after the beginning of the test. As has already been noted, the bis (chloromethyl) disulfide gave 100% control of *Fusarium solani* in a concentration of 2.5 p.p.m.

Bis (chloromethyl) disulfide is a known chemical compound, the preparation and description of which is set forth in the technical literature and, in this connection, reference is made to U.S. Patent 2,966,520, British Patents 815,274 and 825,347 and German Patent 1,097,981.

We claim:
The method of inhibiting the growth of soil fungi which comprises applying thereto a small but effective amount of bis (chloromethyl) disulfide having the following formula:
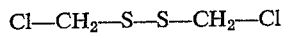
$$Cl-CH_2-S-S-CH_2-Cl$$
References Cited
UNITED STATES PATENTS
| | | | |
|---|---|---|---|
| 2,560,421 | 7/1951 | Eby | 167—22 |
| 2,979,532 | 4/1961 | MacGregor | 260—608 |
| 3,116,335 | 12/1963 | Birum | 167—22 |
| 3,179,556 | 4/1965 | Williamson et al. | 167—22 |
FOREIGN PATENTS
1,171,688  1/1959  France.
ALBERT T. MEYERS, *Primary Examiner.*
MORRIS O. WOLK, JULIAN S. LEVITT, *Examiners.*
J. D. GOLDBERG, *Assistant Examiner.*